(12) United States Patent
Coyle-Gilchrist

(10) Patent No.: US 12,271,472 B2
(45) Date of Patent: Apr. 8, 2025

(54) HIGHLIGHTING FLAGGED INTERACTIVE COMPONENTS IN CONTENT

(71) Applicant: NOKIA TECHNOLOGIES OY, Espoo (FI)

(72) Inventor: Matthew Coyle-Gilchrist, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 554 days.

(21) Appl. No.: 17/270,272

(22) PCT Filed: Aug. 14, 2019

(86) PCT No.: PCT/IB2019/056904
§ 371 (c)(1),
(2) Date: Feb. 22, 2021

(87) PCT Pub. No.: WO2020/044155
PCT Pub. Date: Mar. 5, 2020

(65) Prior Publication Data
US 2021/0319100 A1 Oct. 14, 2021

(30) Foreign Application Priority Data
Aug. 30, 2018 (EP) .................................. 18191702

(51) Int. Cl.
*G06F 21/55* (2013.01)
*G06F 9/451* (2018.01)
*G06F 21/57* (2013.01)

(52) U.S. Cl.
CPC ............ *G06F 21/554* (2013.01); *G06F 9/451* (2018.02); *G06F 21/57* (2013.01); *G06F 2221/033* (2013.01); *G06F 2221/2119* (2013.01)

(58) Field of Classification Search
CPC ...... G06F 21/554; G06F 21/57; G06F 21/564; G06F 9/451; G06F 2221/033; G06F 2221/2119; G06F 2221/2115
See application file for complete search history.

(56) References Cited

U.S. PATENT DOCUMENTS 7,543,146 B1 * 6/2009 Karandikar ......... H04L 63/0823
713/175
8,312,539 B1 11/2012 Nachenberg et al.
(Continued)

FOREIGN PATENT DOCUMENTS

CN  1620053 A  5/2005
CN  101253527 A  8/2008
(Continued)

OTHER PUBLICATIONS

First Examination Report dated Feb. 7, 2022 corresponding to Indian Patent Application No. 202147013725.
(Continued)

*Primary Examiner* — Sangseok Park
(74) *Attorney, Agent, or Firm* — SQUIRE PATTON BOGGS (US) LLP

(57) ABSTRACT

Apparatus, methods and computer programs for receiving first content; receiving second content identifying at least one interactive component comprised by the first content, the at least one interactive component having been flagged by at least one user; and modifying the received first content based on the received second content, to highlight the identified at least one interactive component.

12 Claims, 5 Drawing Sheets

(56) References Cited

U.S. PATENT DOCUMENTS

| | | | | |
|---|---|---|---|---|
| 8,566,950 B1* | 10/2013 | Smith | ................ | G06F 21/57 |
| | | | | 713/192 |
| 8,707,441 B1 | 4/2014 | Cidambi et al. | | |
| 2005/0114545 A1 | 5/2005 | Gopalan et al. | | |
| 2006/0048225 A1* | 3/2006 | Gomez | ................ | G06F 9/451 |
| | | | | 726/22 |
| 2007/0192872 A1 | 8/2007 | Rhoads et al. | | |
| 2007/0198427 A1* | 8/2007 | Vajiravel | ............ | G06Q 30/06 |
| | | | | 705/59 |
| 2008/0098290 A1 | 4/2008 | Williams et al. | | |

FOREIGN PATENT DOCUMENTS

| | | |
|---|---|---|
| CN | 103748573 A | 4/2014 |
| CN | 107169357 A | 9/2017 |

OTHER PUBLICATIONS

International Search Report and Written Opinion dated Nov. 18, 2019 corresponding to International Patent Application No. PCT/IB2019/056904.

Communication pursuant to Article 94(3) EPC dated Oct. 7, 2021 corresponding to European Patent Application No. 18191702.2.

First Office Action dated Feb. 29, 2024 corresponding to Chinese Patent Application No. 201980056934.8, with English summary thereof.

Communication pursuant to Article 94(3) EPC dated Jun. 6, 2024 issued in corresponding European Patent Application No. 18 191 702.2.

Second Office Action dated Jul. 7, 2024 issued in corresponding Chinese Patent Application No. 201980056934.8, with English language summary thereof.

* cited by examiner

HIGHLIGHTING FLAGGED INTERACTIVE COMPONENTS IN CONTENT

TECHNICAL FIELD

The present application relates generally to the modification of content to highlight interactive components comprised by it that have been flagged by one or more users.

BACKGROUND

Some content providers include malicious content amongst the content that they provide to consumers. For example, there are financial and criminal incentives to causing malware to be installed on the computers of content consumers. Such malware takes the form of unwanted computer software or computer software that has unwanted functionality, and typically aims to do one of three things:

- to provide backdoor access to the content consumer's computer system to allow information to be stolen from the consumer or for the computer system to be used illicitly (e.g. as part of a botnet);
- to prevent the normal operation of the consumer's computer system, for example by encrypting and subsequently ransoming data on the system; and
- to deliver advertising content to the consumer, or to steer the user towards viewing particular content through which revenue can be obtained.

However, malicious content is not purely restricted to the unannounced provision of malware. Instead, it is increasingly common to use manipulative UI design to trick consumers into providing consent for actions that they would not willingly agree to. Whilst such actions could relate to e.g. the installation of malware, they are often concerned with directing a consumer to agree for their information to be shared with other businesses, to receive marketing information, to purchase unnecessary products or services, to agree to undesirable contract terms, and/or other actions that may not be in a consumer's best interests.

Such manipulative UI design is sometimes referred to as a "Dark Pattern" and is increasingly problematic as large numbers of users without significant computer or internet experience are gaining access to and beginning to use the World Wide Web, falling victim to these dark patterns.

SUMMARY

In a first aspect there is provided apparatus comprising: means for receiving first content; means for receiving second content identifying at least one interactive component comprised by the first content, the at least one interactive component having been flagged by at least one user; and means for modifying the received first content based on the received second content, to highlight the identified at least one interactive component.

In a second aspect there is provided a method comprising: receiving first content, the first content comprising one or more interactive components; receiving second content identifying at least one interactive component comprised by the first content, the at least one interactive component having been flagged by at least one user identifying at least one of the one or more interactive components that have been flagged by one or more users; and modifying the received first content based on the received second content, to highlight the identified at least one interactive component.

In a third aspect there is provided a computer program product comprising a computer-readable medium bearing computer program code embodied therein for use with a computer, the computer program code comprising: receiving first content, the first content comprising one or more interactive components; receiving second content identifying at least one interactive component comprised by the first content, the at least one interactive component having been flagged by at least one user identifying at least one of the one or more interactive components that have been flagged by one or more users; and modifying the received first content based on the received second content, to highlight the identified at least one interactive component.

Also disclosed is apparatus comprising a processor; and memory including computer program code, the memory and the computer program code configured to, working with the processor, cause the apparatus to: receive first content, the first content comprising one or more interactive components; receive second content identifying at least one interactive component comprised by the first content, the at least one interactive component having been flagged by at least one user identifying at least one of the one or more interactive components that have been flagged by one or more users; and modify the received first content based on the received second content, to highlight the identified at least one interactive component.

BRIEF DESCRIPTION OF THE DRAWINGS

For a more complete understanding of examples, reference is now made to the following description taken in connection with the accompanying drawings in which.

DETAILED DESCRIPTION OF THE DRAWINGS

Examples and their potential advantages are understood by referring to FIGS. 1 through 9 of the drawings.

FIGS. 1A-1D illustrate four examples of manipulative UI design.

Figure 1A:
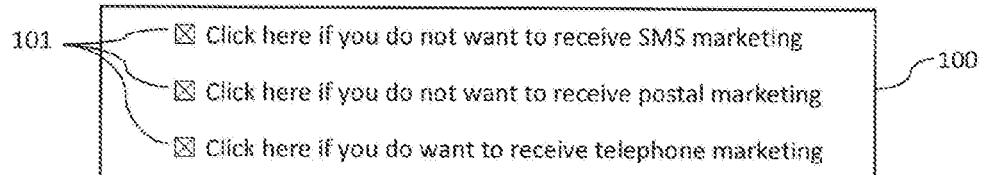
FIGS. 1A-1D illustrate four user interfaces which are examples of manipulative UI design.

In FIG. 1A a UI 100 presents content that includes three checkboxes 101 using which the user can agree to certain terms. In this example all three checkboxes relate to the user consenting (or not) to be contacted via various channels for the purposes of marketing. However, to avoid receiving any marketing communications the user is required to check the first two boxes but to leave the third unchecked since the first two are checked to decline marketing and the third is checked to request marketing. By reversing the instructions for the last box, the content provider hopes that the user will after the first one or two checkboxes assume a pattern of checking all the boxes without reading their associated text instead of carefully reading each line of text, and as a consequence unwittingly provide their consent to be (in this example) contacted by telephone.

Figure 1B:
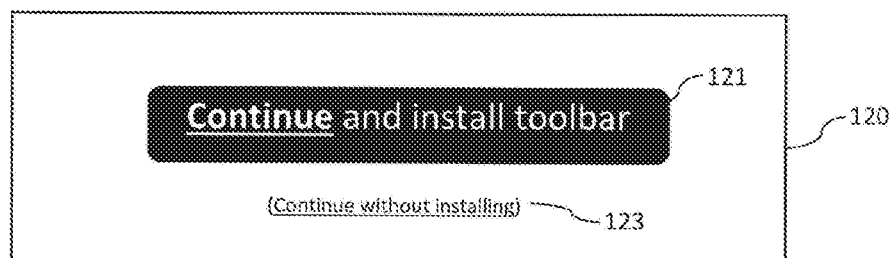

In FIG. 1B a UI 120 provides two selectable components using which the user can "continue" through content that is being presented to him. The first component 121 is presented as a very visible clickable button with the word "continue" heavily emphasised, whilst the second component 123 is presented as a small hyperlink that is significantly less visible than the first component 121. If the user chooses to select the first component 121 then he consents to a toolbar being installed on his computer system, which he may not want. However, it is this component that he is most likely to select unless he pauses to carefully look for and carefully consider each option. By selecting the first component 121 after only a superficial glance, perhaps in his haste to "continue" to the subsequent content, he will unwittingly consent to the installation of a toolbar he likely does not want. Such an approach is commonly used to trick consumers into consenting to the installation of malware.

Figure 1C:

In FIG. 1C a UI 130 uses a similar approach to that of FIG. 1B in order to trick a user viewing a description of a software application he wishes to download ("SuperPix Editor") into instead downloading a completely different piece of software—again a toolbar. In this example a first selectable component 131 to install the toolbar is presented as a button and heavily emphasised relative to the far less visible hyperlink component 132 that will actually trigger a download of the software the user wants. However, this example goes further than that of FIG. 1B by replicating in its first component 131 the iconography, colours, and layout of a "download" button that the user is used to seeing on trusted app stores, to further give the incorrect impression that selecting the first component 131 will have the action the user is looking for. The first component 131 thereby masquerades as having a function that it does not in fact provide.

Figure 1D:
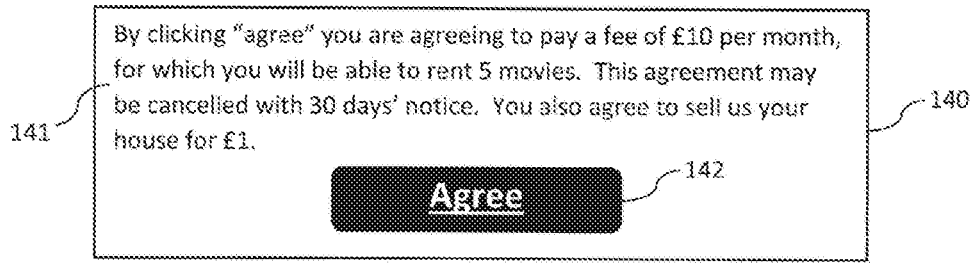

Finally, FIG. 1D presents a UI 140 in which the user is presented with a text 141 and an "Agree" button component 142. Here the UI 140 is not designed to lead the user to select a different component to the one he seeks (per FIGS. 1B and 1C), but simply conceals the implications of selecting the button 142 by hiding an unreasonable term (in this example an agreement that the user will sell his house for a negligible amount of money) in a larger body of text 141 (reasonable terms regarding a movie rental service) in the hope that the user will not notice it. A user skim reading the text 141 might therefore click "Agree" without understanding the full implications of doing so.

All of the above are examples of manipulative UI design that rely upon confusing, distracting, or misdirecting the user. Such approaches may be referred to generally as "dark patterns". FIGS. 1A to 1D are merely representative examples of four different dark patterns, but a vast number of similar techniques are used to mislead users into selecting or otherwise interacting with interactive components in content where these components are presented in a way that obscures the effect of the user interacting with them.

Figure 2:
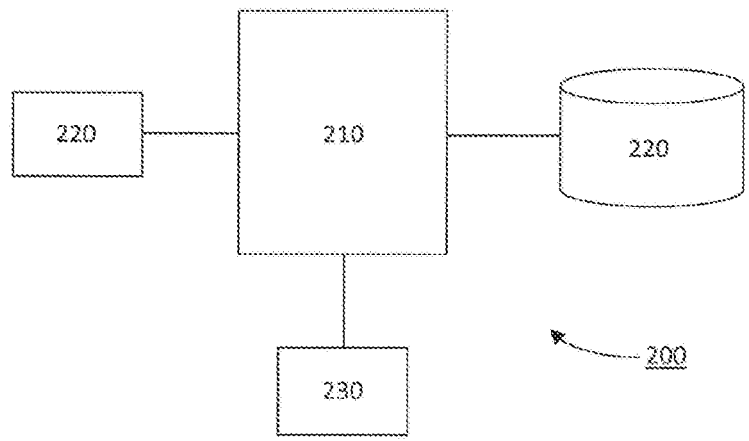
FIG. 2 illustrates an apparatus.

FIG. 2 illustrates an apparatus 200 according to an example. The apparatus 200 of this example comprises a processor 210 and a memory 220. The memory 220 may store computer code that is executable by the processor 210 in order to cause the apparatus to perform various functions.

Many different implementations of the processor 210 and memory 220 may be possible. For example, the processor 210 may be a single processor, or it may comprise more than one processor working cooperatively. The memory 220 may be a single memory or may comprise multiple memories of the same or different types. For example, the memory 220 may comprise volatile memory such as volatile Random Access Memory (RAM) that may include a cache area for the temporary storage of data and/or other memory, for example non-volatile memory which may be embedded or be removable. Such non-volatile memory may comprise EEPROM, flash memory, a compact disc, flash drive, a hard drive, or the like. The memory 220 may store any of a number of pieces of information—for example an operating system for controlling the apparatus 200, application programs that can be run on the operating system, and user and/or system data. In some examples, the processor 210 and memory 220 may be present in the form of an Application Specific Integrated Circuit (ASIC), a Field Programmable Gate Array (FPGA), or any other application-specific component.

The apparatus 200 of FIG. 2 may comprise other parts. Illustrated, by way of example, is a user interface 220 through which a user may interact with the apparatus. Suitable user interfaces may comprise output devices for presenting content for a user, such as any of a display for presenting visual content, a speaker or other audio output for presenting audible content, a haptic output device for presenting haptic output, and so on.

Also illustrated by way of example is a network interface 230 that permits the apparatus 200 to communicate with other devices over a communication network such as a local area network or a wide area network such as the Internet.

The apparatus 200 may be embodied as a user device or a part thereof. For example, a computer terminal such as a personal computer, a smartphone, a tablet computer, a smart watch, an e-book reader, or any other such device. The apparatus 200 may be configured to run a web browser for fetching and rendering worldwide web content such as webpages. Alternatively, the apparatus 200 may be embodied as a device to which a user may not normally have direct access; for example, a server, network router, internet gateway, or the like.

Figure 3:
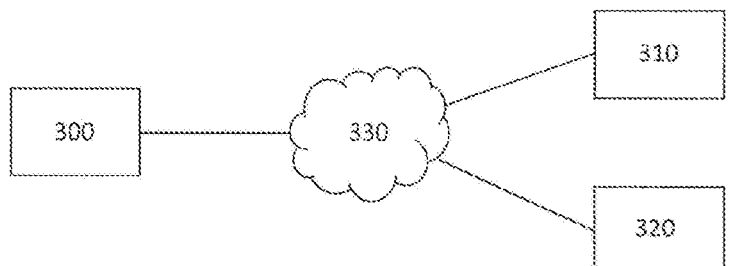
FIGS. 3-6 are network diagrams showing devices interconnected by communication networks.

FIG. 3 illustrates an example where a user device 300 (e.g. the apparatus 200 of FIG. 2) is connected to a content server 310 and a warning server 320 via a communication network 330. The user device 300 is configured to receive content from content server 320 for consumption by a user of the user device 300. The content server 320 may serve content of any form, but in some examples it is a web server serving web content such as one or more webpages. The user device 300 may be configured to request first content from the content server 320 based on a user request, for example to fetch web content that pertains to a URL entered or selected by the user of the user device 300. On receiving content from the content server 320, the user device 300 may then request second content comprising warning information pertaining to the first content from the warning server 320. The warning information identifies interactive components within the first content that have been flagged by users as relating to misleading parts of the first content.

The term interactive component may refer to any part of the first content which can receive a user input. Examples of an interactive component may therefore include a button, a text input field, a checkbox, a hyperlink, a clickable image, etc. Where the first content is not visual content but is instead content of another form, the interactive component may be specific to that form—for example a pause in audio content for the user to provide voice input.

The warning information may be provided to the user device 300 based an identification of the first content sent to the warning server 320 by the user device 300. For example, the user device 300 might send address information identifying the first content (e.g. a URL of the first content), a reference number or other codified identifier of the first content, a title of the first content, and/or the first content itself (whereupon the warning server or a separate entity employed by the warning server for this purpose, may attempt to identify the first content or to match it to content already known to the warning server).

On receipt of the warning information from the warning server 320, the user device 300 modifies the first content to highlight the identified interactive components within the first content, to alert the user to the fact that the interactive component has been flagged as misleading and enable him to take special care when interacting with it. This modified content can now be presented to the user, for example by apparatus 200.

The modification of the first content may be performed by a user device such as user device 300 that both receives a user input identifying the first content to be fetched by the device, and also presents the modified first content to the user. However, other arrangements are possible whilst still providing the user with warnings of misleading content.

The user device 300 may run a web browser that requests and receives the first content from one or more web servers. The user device may be further provided with software for obtaining the second content and modifying the first content, and this software may be provided in the form of a plug-in to the web browser.

In the example of FIG. 3 the user device 300 obtains the first content from a content server 310. However, it is to be understood that other origins of the first content are equally possible. For example, the first content may already be stored locally at the user device 300 or may be retrieved by the user device 300 from a different source such as a removable storage medium (e.g. a compact disc, flash drive, SD card, or similar). In such examples the same operation applies as has been described above—i.e. the user device 300 provides an indication of the first content (or the first content itself) to the warning server 320 in order to obtain in response an indication of the flagged interactive component (s) within the first content.

Figure 4:
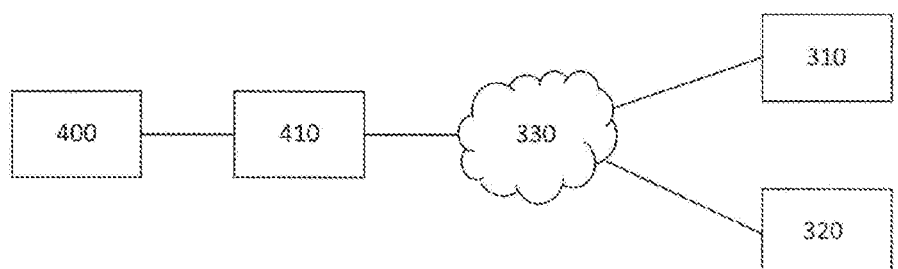

In FIG. 4 a user device 400 is connected to the content server 310 and warning server 320 through the network 330, via a gateway device 410. Here the gateway device 410 may be apparatus 200. This arrangement operates similarly to that shown in FIG. 3, except that the gateway device 410 receives a request for the first content from the user device 400 and then obtains the first content and the second content on behalf of the user device and modifies the first content to highlight the interactive components indicated by the second content before providing the modified first content to the user device 400. As such, the user device 400 might not ever receive the unmodified first content.

A gateway device 410 such as that of FIG. 4 might be provided by a proxy server, for example a web proxy for accessing content on the worldwide web. The gateway device 410 might be implemented as part of a LAN, for example at a network router. For example, the gateway device 410 may be an internet router in a home, office, or other environment. The gateway device may comprise more than one individual device, for example it may comprise a plurality of servers such as a plurality of servers at an Internet Service Provider or other service provider, serving to provide warnings of misleading interactive components in content served to its customers.

Figure 5:
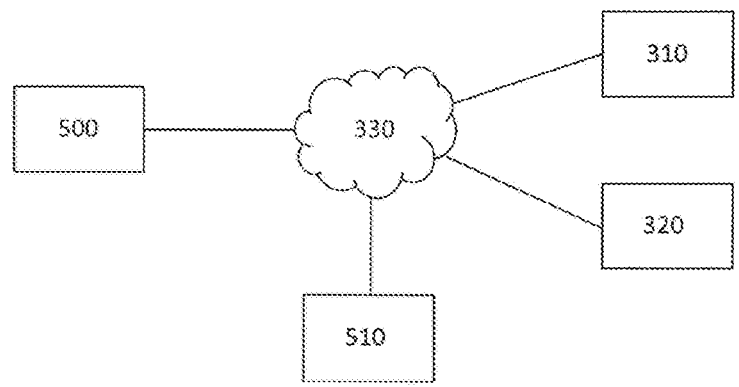

FIG. 5 shows another example where this time the modification of the first content for provision to a user device 500 is performed at a server 510 (e.g. according to apparatus 200) that is provided not as a gateway device but instead as a server 510 accessible from the user device 500 over the communication network 330. Whilst the server 510 is in this example not an intermediary between the user device 500 and the network 330, it may still obtain the first content from the content server 310 and the second content from the warning server 320 on the user device's 500 behalf, modifying the first content for provision to the user device 500. Alternatively, the user device may obtain the first and/or second content directly for itself and send that content to the server 510 in order that the server can modify the first content using the second content, as described above. Alternatively, as described in relation to FIG. 3, the first content may be provided not by a content server 310 but instead be available locally to the user device 500.

Figure 6:
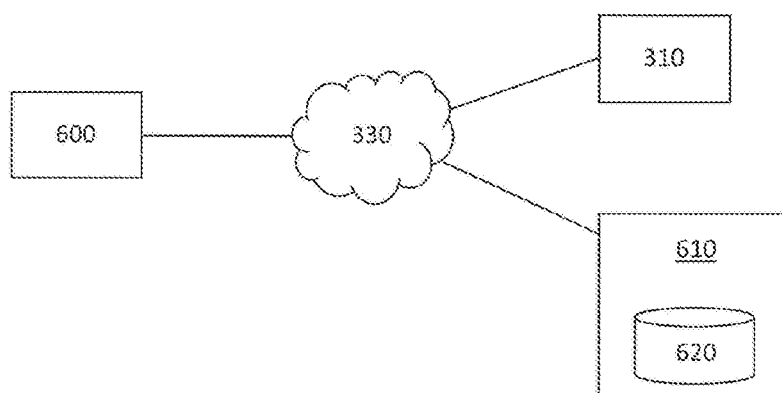

FIG. 6 shows yet another example in which a warning server 610 itself modifies the first content for provision to a user device 600. Here the warning server 610 may be according to apparatus 200. The warning server 610 may receive, from the user device 600, an indication of the first content or the first content itself. If the warning server 610 receives an indication of the first content rather than the first content itself, it may then obtain the first content for itself, e.g. from the content server 310. The warning server may comprise a database 620 of warning information associated with various content and may receive from this database 620 second content identifying the one or more interactive components of the first content that have been flagged by users, and modify the first content based upon this second content, providing the modified first content to the user device 600.

Again, a separate content server 310 need not actually be present in the arrangement shown in FIG. 6—instead, the first content may (for example) be available locally at the user device 500.

In another, unillustrated, example content server could itself modify the first content based on second content stored locally to the content server or obtainable by the content server from a warning server. However, such an example is less likely in practice since the content provider responsible for the content server is unlikely to provide both content that includes misleading interactive components and also the means for drawing the user's attention to the misleading nature of those components. However, there is no reason why such an arrangement may not be used in principle, and use cases do exist where it may be appropriate—for example where content from a content provider and warning data maintained by a warning provider are separately stored on the same server, for example where space on the same server is made available to multiple organisations.

There are numerous different ways in which the highlighting of interactive components can be performed in the modified first content. For example, where the content is visual content, a change in colour, animation, and/or marking of the content (e.g. drawing boxes, arrows, lines etc. onto the content) may be used. Where the content is audible, audible highlighting such as a change in volume, application of an audio effect (e.g. echo) or sound sample (e.g. warning tone or announcement) may be applied to the audio content when the interactive component is presented. Many other alternatives may be suitable.

Figure 7A:
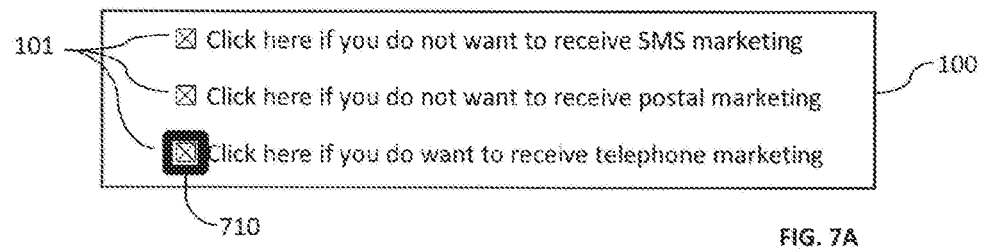
FIGS. 7A-C illustrate modified versions of the user interface of FIG. 1D.

FIG. 7A illustrates the content presented by the UI 100 of FIG. 1A modified so as to highlight the third (misleading) checkbox. Here the checkbox has been surrounded with a coloured border 710, represented in the figure by a thick, dark line so as to clearly visually distinguish it from the rest of the content.

Figure 7B:
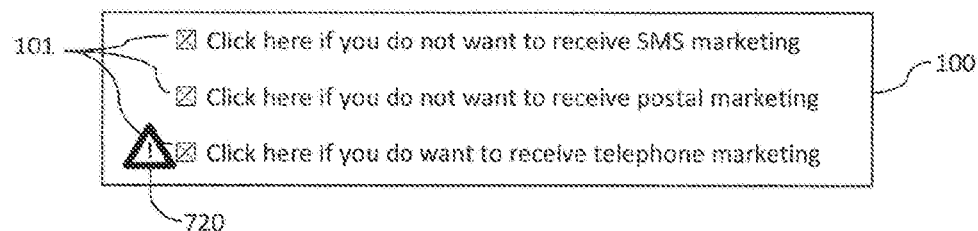

FIG. 7B illustrates an alternative modification of the content of UI 100 of FIG. 1A, through the addition of an image 720 adjacent the third textbox. In this case the image is an exclamation mark in a triangle—a recognised symbol for a warning, but any suitable image or images could be used, or indeed any other visual addition to the content. The addition of an image may comprise modifying the content to include the image data or it may instead comprise modifying the content to include a reference to the image in order that the image can be obtained and presented with the content (e.g. including a URL or other identification of a location where the image is stored and from where it can be retrieved for presentation to a user). Images can be visually striking, especially when included in textual content, and modifying the content through the addition of an image may therefore provide a clear warning to the user.

Figure 7C:
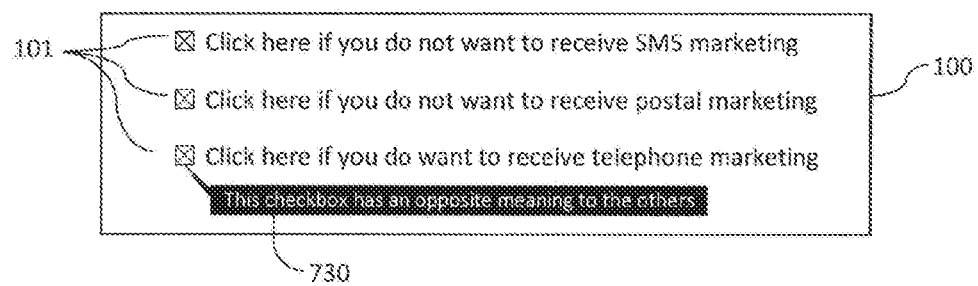

In FIG. 7C the content of UI 100 of FIG. 1A has been modified to highlight the third checkbox by changing the checkbox's colour from black to red (crudely represented by a black box with a white check in the monochrome figure) and also through the addition of an explanation 730 as to why the third checkbox is misleading. In the figure this explanation is a textual explanation 730, but any indication that conveys an explanation to the user may be used—for example a colour code or pictorial representation. This explanation 730 is of considerable use to the user, since the modified first content now not only alerts him to a misleading interactive component with which he needs to take special care, but also advises him how that component is attempting to mislead him so as to better guide him to avoid making a misled input using it.

In order to provide an explanation as to why an interactive component is misleading, the apparatus modifying the first content may receive this explanation together with the indication of the interactive component from the warning server in response to the indication of the first content.

Figure 8A:
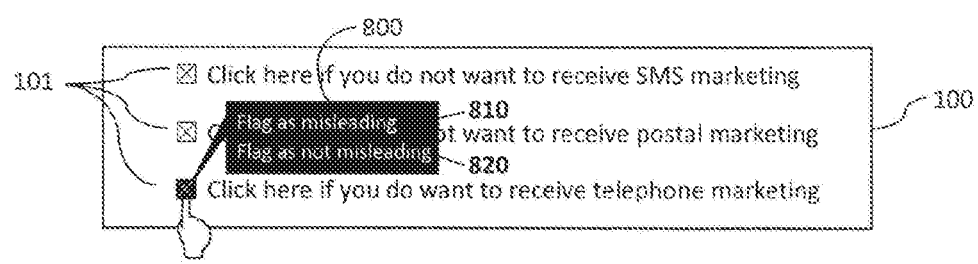
FIG. 8A illustrates a modified version of a user interface.

FIG. 8A illustrates a user interface 100 presenting content to a user of a user device, such as apparatus 200. In this example the user interface 100 is that of FIG. 1A. However, the user has noticed that an interactive component forming part of the content is misleading—in this case it is the third checkbox 101. The user device provides a means for the user to flag the interactive component as misleading. In this example the user interface 100 is a touch interface and the user long-touches on the third checkbox to open a contextual menu 800 that includes an option 810 to flag the checkbox as misleading. However, it will be understood that any suitable user input may be associated with the flagging of the interactive component, for example any mouse, touch, voice or other input or sequence of inputs that identifies the interactive component in such a way that the user device can determine that the user wishes to flag it.

In FIG. 8A the interactive component that is being flagged has not already been highlighted to the user as misleading. However, the fact that an interactive component has already been highlighted does not necessarily preclude a user from flagging it. To the contrary, the flagging of an interactive component by a user that has already been identified as misleading may provide confirmation that the interactive component has been correctly identified as misleading, or that it remains misleading (e.g. in the event that the content that it includes it has been modified). It may be the case that interactive components are highlighted only when a tagging criterion has (or flagging criteria have) been met, for example when a minimum number or proportion of users have flagged the interactive component as being misleading, including when they have done so within a predetermined time period, for example a rolling time period. For instance, an interactive component might be indicated as misleading if at least 10 users have reported it as such within the preceding 14 days.

FIG. 8A also illustrates another option 820 within the menu 800, this time for providing flagging that the interactive component is not misleading. The user may alternatively select this option to provide such a flag. This may be useful when, for example, an interactive component has been mistakenly flagged as misleading, or where it was correctly flagged as misleading at a previous time but where a subsequent revision of the content means that it is no longer misleading. An example of the latter case might be, for example, a change in the text associated with the third of the checkboxes 101.

The provision of an indication that the interactive component is misleading may be based on both flags that it is misleading and also upon flags that it is not misleading. It may be, for example, based on only the most recent flags and/or a proportion of flags that it is misleading to flags that it is not.

It is not necessarily the case that the user is provided with an option to flag an interactive component as not misleading. He may be provided with only an option to flag it as misleading. In the latter case, basing an indication that the interactive component is misleading upon both the existence of flags and their timing may be desirable, so that e.g. a flag expires after a certain period of time.

Figure 8B:
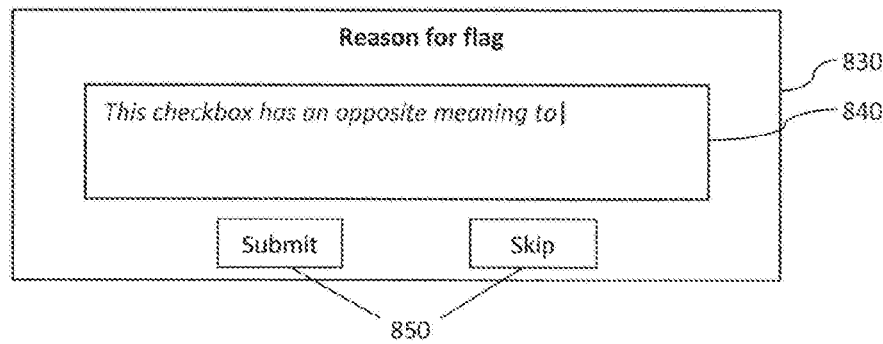
FIG. 8B illustrates a dialogue.

FIG. 8B illustrates an example of a dialogue 830 that may be presented to a user following his flagging of an interactive component, enquiring as to the reason for the flag. In this example the dialogue 830 comprises a free text field 840 and buttons 850 to submit the entered reason or to skip its submission. In other examples the reason might not be requested, or might be requested in a different way (e.g. asking the user to select from a set of predefined reasons). In some examples the user may not be presented with a separate dialogue 830 but may be provided with an interface for indicating his reason as part of the action of flagging the interactive component—for example, menu 800 of FIG. 8A might include separate options for "Report misleading wording" and "Report misleading appearance".

Once the user has flagged an interactive component (and, perhaps, also provided a reason for the flag) an indication of the flag (and reason for it) may be communicated to a repository for storing information regarding the flagging of the interactive components. For example, a warning server that provides indications of the flagged interactive components may comprise a repository such as a database for storing information relating to flags, or may be in communication with a separate repository for storing such information such as an external storage device or a remote server.

Figure 9:
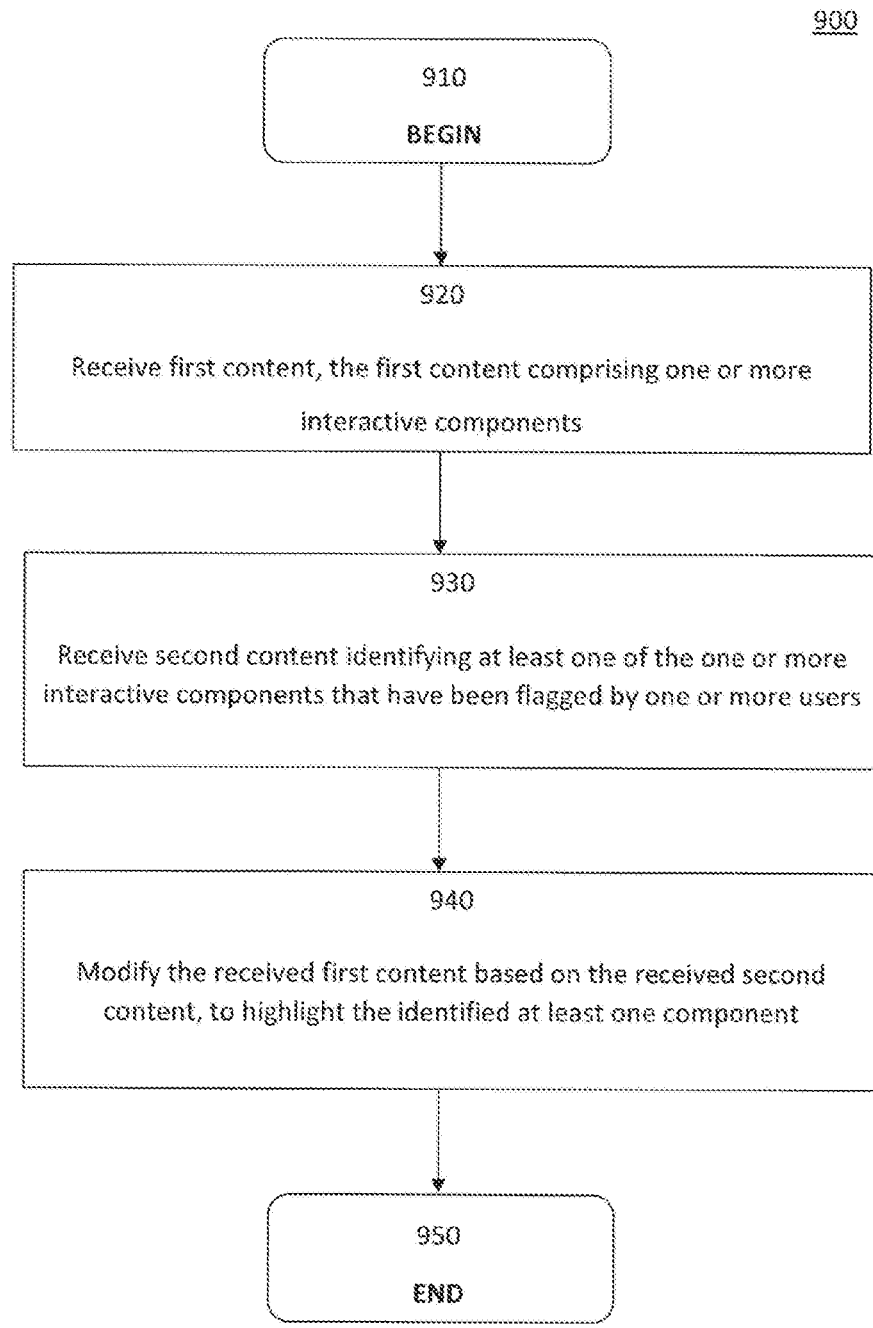
FIG. 9 is a flow chart illustrating a method.

FIG. 9 illustrates a method 900 performed by apparatus 200 as described in the examples above. The method 900 begins at 910. In step 920 the method 900 receives first content comprising one or more interactive components. In step 930 the method receives second content identifying at least one of the one or more interactive components that have been flagged by one or more users. In step 940 the method 900 modifies the received first content based on the received second content, to highlight the identified at least one component. The method 900 then ends 950.

Note that the "receive" steps 920, 930 of method 900 do not necessarily refer to the reception of content from a different apparatus. For example, if the first and/or second content is available locally at apparatus 200 then the apparatus may still receive the content from the local repository where it is stored. However, in many examples the first and/or second content will be received from repositories that are remote from the apparatus 200.

Without in any way limiting the scope, interpretation, or application of the claims appearing below, a technical effect of one or more of the examples disclosed herein is that a user viewing the modified first content is alerted to interactive components in the first content that are misleading and is less likely to mistakenly perform user inputs using such components that are not in line with his intentions. Such modification also permits the user to interact with content more quickly, since the burden of carefully reviewing each interactive component and the content associated with it is to some extent shared with other users who have or have not tagged the interactive content to indicate whether or not it is misleading.

In modifying the content based on an indication of the tagging of the interactive components by users, this approach is applicable to scenarios where content has been designed to be subtly misleading in terms of the overall impression created for a user rather than through the inclusion of specific text or images that can be searched for by an automatic system. The tagging may be based on, for example, a subjective assessment by a large body of users rather than relying on specific objective features that could be identified by e.g. parsing the content automatically.

The modification of the content also provides advantages over approaches where certain content is simply blocked because it is deemed to be malicious, because the user remains free to interact with highlighted components, and is instead guided to be vigilant when a component has been flagged as misleading. For example, a checkbox indicating whether or not a user wishes to add insurance to a travel booking may be presented in such a way as to deliberately mislead the user into requesting travel insurance even if he does not wish to do so; highlighting the checkbox warns the user without depriving him of the ability to interact with it to request travel insurance should he in fact desire it.

Example embodiments of the present invention may be implemented in software, hardware, application logic or a combination of software, hardware and application logic. The software, application logic and/or hardware may reside on a removable memory, within internal memory or on a communication server. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of a computer described and depicted in FIG. 2. A computer-readable medium may comprise a computer-readable storage medium that may be any media or means that can contain or store the instructions for use by or in connection with an instruction execution system, apparatus, or device, such as a computer.

In some example embodiments, the invention may be implemented as an apparatus or device, for example a mobile communication device (e.g. a mobile telephone), a PDA, a computer or other computing device, or a video game console.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Furthermore, although particular combinations of features have been described in the context of specific examples, it should be understood that any of the described features may be present in any combination that falls within the scope of the claims.

What is claimed is:

1. Apparatus, comprising:
at least one processor; and
at least one memory including computer program code, the at least one memory and the computer program code configured to, with the at least one processor, cause the apparatus to perform:
receiving first content;
receiving second content identifying at least one interactive component comprised by a part of the first content which is configured to receive a user input, the at least one interactive component having been flagged as misleading by a minimum number or proportion of users within a predetermined time period; and
modifying the received first content based on the received second content, to highlight that the identified at least one interactive component has been flagged as misleading while enabling a user to interact with the highlighted at least one interactive component.

2. The apparatus of claim 1, wherein the at least one memory and computer program code are further configured, with the at least one processor, to cause the apparatus to perform:
requesting the second content based on the reception of the first content.

3. The apparatus of claim 1, wherein:
the second content comprises a reason why the at least one interactive component has been flagged; and wherein
the modifying the received first content comprises providing an indication of the reason within the modified first content.

4. The apparatus of claim 1, wherein highlighting the at least one component comprises changing the visual appearance of the first content.

5. The apparatus of claim 1, wherein the at least one memory and computer program code are further configured, with the at least one processor, to cause the apparatus to perform presenting the modified first content to a user.

6. The apparatus of claim 1, wherein the at least one memory and computer program code are further configured, with the at least one processor, to cause the apparatus to perform providing the modified first content to a user device for presentation to the user.

7. The apparatus of claim 1, wherein the at least one memory and computer program code are further configured, with the at least one processor, to cause the apparatus to perform:
receiving a user input flagging at least one interactive component within the modified first content; and
sending an indication of said at least one interactive component flagged by the user to the source of the received second content.

8. The apparatus of claim 1, wherein the at least one memory and computer program code are further configured, with the at least one processor, to cause the apparatus to perform receiving a user input flagging at least one interactive component within the modified first content as not being misleading.

9. The apparatus of claim 1, wherein the apparatus comprises a user device.

10. The apparatus of claim 1, wherein the apparatus comprises a network router or internet gateway.

11. A method, comprising:
   receiving first content;
   receiving second content identifying at least one interactive component comprised by a part of the first content which is configured to receive a user input, the at least one interactive component having been flagged as misleading by a minimum number or proportion of users within a predetermined time period; and
   modifying the received first content based on the received second content, to highlight that the identified at least one interactive component has been flagged as misleading while enabling a user to interact with the highlighted at least one interactive component.

12. A computer program embodied on a non-transitory computer-readable medium, said computer program comprising computer program code which, when executed on an apparatus, cause the apparatus to perform:
   receiving first content;
   receiving second content identifying at least one interactive component comprised by a part of the first content which is configured to receive a user input, the at least one interactive component having been flagged as misleading by a minimum number or proportion of users within a predetermined time period; and
   modifying the received first content based on the received second content, to highlight that the identified at least one interactive component has been flagged as misleading while enabling a user to interact with the highlighted at least one interactive component.

* * * * *